(No Model.)

G. BROWNLEES.
THILL COUPLING.

No. 529,590. Patented Nov. 20, 1894.

WITNESSES:
E. B. Bolton
A. S. Busing

INVENTOR
George Brownlees
BY
Reuardo R
ATTORNEYS

UNITED STATES PATENT OFFICE.

GEORGE BROWNLEES, OF NARRACOORTE, SOUTH AUSTRALIA.

THILL-COUPLING.

SPECIFICATION forming part of Letters Patent No. 529,590, dated November 20, 1894.

Application filed March 27, 1894. Serial No. 505,299. (No model.)

*To all whom it may concern:*

Be it known that I, GEORGE BROWNLEES, coachsmith, a subject of the Queen of Great Britain and Ireland, residing at the township of Narracoorte, in the province of South Australia, have invented a certain new and useful Safety Shaft-Pin and Spring-Clip for Vehicles and Portable Machinery; and I do hereby declare that the following is a full, clear, and exact description of the same.

My invention relates to a certain shaft pin and spring clip for the securement of shafts to the axles or other suitable parts of vehicles, agricultural machinery, agricultural implements, and the like.

The special object of my invention is to provide an attachment of such a nature as will firmly, and automatically secure the shaft pin in its sockets, but will at the same time allow the said pin to be withdrawn without the necessity of unscrewing retaining nuts as is the case with the majority of shaft pins now in use.

In order that my invention may be the better understood I will now proceed to describe the same by reference to the accompanying illustrations, in which—

Figures 1, 2:
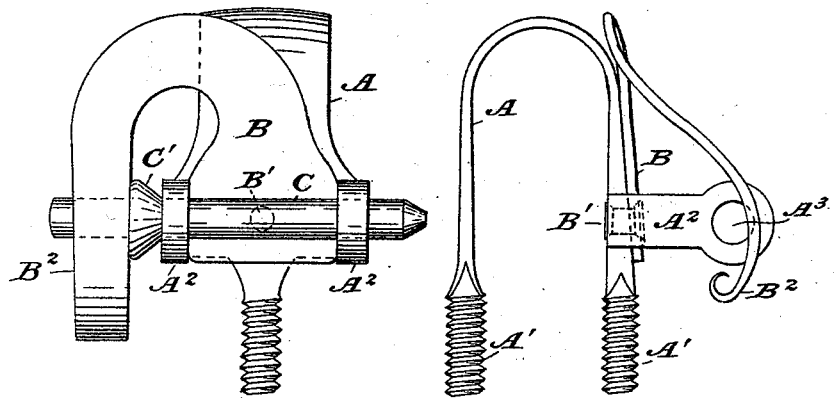
Figure 3:
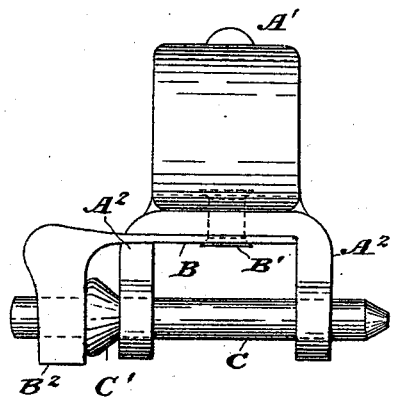

Figure 1 is a front elevation of complete device. Fig. 2 is a side view and Fig. 3 is a plan of same.

In all cases similar letters of reference are used to denote similar parts.

A is the metal arch into which the axle of the vehicle is fitted. The arch terminates with the bolt ends A' in the ordinary manner, and is provided with the pin-lugs or sockets $A^2$, through which a pin hole $A^3$ is drilled as shown in drawings. The butt end of a steel spring clip B is neatly fitted between the aforesaid pin lugs, and is secured to the front side of the metal arch by means of a rivet B'. The contour of the spring clip for the sake of convenience curves over toward the outer sides of the vehicle, clearing the lug by a space of about three-eights of an inch at its free end $B^2$ and slightly overlapping the parallel clearway of the holes $A^3$. The pin which is used is shown at C, near one end of which the diameter is increased by a shoulder piece preferably in the form of a conical frustum C'.
The length of the portion which has an increased diameter is equal to the space between the lug $A^2$ and the free end of the spring clip $B^2$ above mentioned.

In order to secure the pin in position it is only necessary to drive it through the holes in the lugs, during which operation the spring is slightly lifted by the conical part of the pin, but as soon as the pin has been driven home the free part of the spring closes down on the smaller diameter of the pin end, thus forming an automatic lock with the shoulder piece. By this means the necessity of using nuts for holding the pin in place and the frequent trouble caused by the said nuts working themselves loose are entirely obviated, while the annoyance caused by rattling of the shaft pin is materially overcome. If it is desired to release the pin it is only necessary to press the spring forward and clear of the shoulder piece. When this has been done the pin may easily be withdrawn as will be well understood.

Having now described my invention, what I claim as new, and desire to secure by Letters Patent, is—

In a thill coupling, a clip pin A, pin lugs $A^2$, a bolt adapted to enter said lugs, a conical projection on said bolt, and a spring B formed of a distorted U shape, one end being secured to the clip, and the other end forming a spring extending forwardly and laterally in line with the opening in the lugs and adapted to engage the bolt head, substantially as described.

In testimony whereof I have signed my name in the presence of two subscribing witnesses.

GEORGE BROWNLEES.

Witnesses:
JOHN HERBERT COOKE,
WILLIAM WELWOOD.